United States Patent
Baines

(10) Patent No.: US 6,421,334 B1
(45) Date of Patent: *Jul. 16, 2002

(54) TECHNIQUE FOR TIME ALIGNMENT OF UPLINK CDMA SIGNALS

(75) Inventor: Steven John Baines, Stansted (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,010

(22) Filed: May 13, 1998

(51) Int. Cl.[7] .......................... H04B 7/216; H04V 13/00
(52) U.S. Cl. ...................... 370/342; 370/335; 370/441; 375/130; 375/140; 455/65
(58) Field of Search .................................. 370/210, 331, 370/335, 342, 441, 328; 455/65; 375/324, 347, 130, 140

(56) References Cited

U.S. PATENT DOCUMENTS

| 5,353,300 A | | 10/1994 | Lee et al. |
| 5,361,276 A | | 11/1994 | Subramanian |
| 5,481,570 A | * | 1/1996 | Winters ...................... 375/347 |
| 5,509,035 A | | 4/1996 | Teidemann, Jr. et al. |
| 5,675,616 A | * | 10/1997 | Hulbert et al. ............... 375/355 |
| 5,745,484 A | | 4/1998 | Scott |
| 5,793,796 A | * | 8/1998 | Hulbert et al. ............... 375/206 |
| 5,974,079 A | * | 10/1999 | Wang et al. .................. 375/200 |
| 6,104,747 A | * | 8/2000 | Jalloul et al. ................ 375/150 |
| 6,256,338 B1 | * | 7/2001 | Jalloul et al. ................ 375/142 |
| 6,269,075 B1 | * | 7/2001 | Tran ........................... 370/206 |
| 6,324,160 B1 | * | 11/2001 | Martin et al. ................ 370/209 |
| 6,345,078 B1 | * | 2/2002 | Basso .......................... 375/349 |

FOREIGN PATENT DOCUMENTS

WO    WO 97/31429    8/1997

* cited by examiner

Primary Examiner—Hassan Kizou
Assistant Examiner—Joe Logsdon
(74) Attorney, Agent, or Firm—Lee, Mann, Smith, McWilliams, Sweeney & Ohlson

(57) ABSTRACT

The present invention relates to communication systems and in particular relates to the time alignment of uplink CDMA signals. A simple approach for improving the performance of received CDMA signals is discussed. This consists of aligning the timings of users' signals such that the maximum output power from a single rake finger for each user occurs simultaneously. This allows the timing to be adjusted for each user's signal independently of the others and has the effect of minimizing any interference between users. The invention provides a time alignment mechanism which employs a minimum of signalling.

19 Claims, 7 Drawing Sheets

ITU-B Responses at IS-95 (left) and Wideband (right) Chip Rates

| Tap | ITU-A Channel Model | | ITU-B Channel Model | |
|---|---|---|---|---|
| | Delay (ns) | Power (dB) | Delay (ns) | Power (dB) |
| 1 | 0 | 0 | 0 | 0 |
| 2 | 110 | -9.7 | 200 | -0.9 |
| 3 | 190 | -19.2 | 800 | -4.9 |
| 4 | 410 | -22.8 | 1200 | -8.0 |
| 5 | --- | --- | 2300 | -7.8 |
| 6 | --- | --- | 3700 | -23.9 |

Table 1: Power Delay profiles for ITU-A and B Outdoor to Indoor mobile channel models

| Alignment Technique | All Multipaths Rayleigh | | First Multipath is LOS | |
|---|---|---|---|---|
| | IS95 chip rate | Wideband chip rate | IS95 chip rate | Wideband chip rate |
| First component | 0.0589 | 0.1921 | 0.0376 | 0.1290 |
| Instantaneous peak | 0.0444 | 0.1418 | 0.0252 | 0.0834 |
| Peak mean | 0.0629 | 0.2234 | 0.0376 | 0.1290 |

OF for ITU-A, tap timing fixed at ITU model values

| | | | | |
|---|---|---|---|---|
| First component | 0.0769 | 0.2011 | 0.0431 | 0.1196 |
| Instantaneous peak | 0.0555 | 0.1542 | 0.0316 | 0.0970 |
| Jump | 0.0700 | 0.1919 | 0.0403 | 0.1185 |
| Peak mean | 0.0909 | 0.2390 | 0.0491 | 0.1270 |

OF for ITU-A, tap timing deviation=50nS

| | | | | |
|---|---|---|---|---|
| First component | 0.5840 | 0.7065 | 0.5738 | 0.7018 |
| Instantaneous peak | 0.4791 | 0.6474 | 0.4806 | 0.6418 |
| Peak mean | 0.5954 | 0.7279 | 0.5678 | 0.6998 |

OF for ITU-B, tap timings fixed at ITU model values

| | | | | |
|---|---|---|---|---|
| First component | 0.5811 | 0.6754 | 0.6172 | 0.7070 |
| Instantaneous peak | 0.4843 | 0.6377 | 0.4953 | 0.6573 |
| Jump | 0.5239 | 0.6701 | 0.5234 | 0.6870 |
| Peak mean | 0.6216 | 0.7654 | 0.6077 | 0.7380 |

OF for ITU-B, tap timing deviation=100nS

| | | | | |
|---|---|---|---|---|
| First component | 0.3470 | 0.4535 | 0.3852 | 0.4635 |
| Instantaneous peak | 0.2740 | 0.4165 | 0.2787 | 0.4264 |
| Jump | 0.3274 | 0.4661 | 0.3199 | 0.4590 |
| Peak mean | 0.3945 | 0.5527 | 0.3953 | 0.5032 |

OF for equal split between ITU-A and ITU-B, tap timing deviation=100nS

Table 2

TECHNIQUE FOR TIME ALIGNMENT OF UPLINK CDMA SIGNALS

FIELD OF THE INVENTION

The present invention relates to communication systems and in particular relates to the time alignment of uplink CDMA signals.

BACKGROUND OF THE INVENTION

Communication systems employing Code Division Multiple Access (CDMA), signals between a base station and a subscriber are transmitted over a frequency band of the particular communication channel with a particular subscriber spreading code. That is to say the signals in the communication channel for a particular frequency band of the communication channel are separated by these particular spreading codes. These particular subscriber spreading codes are preferably orthogonal with respect to each other such that a cross correlation between time aligned spreading codes is 0.

The orthogonality factor (OF) is a measure of how badly a multi-path channel degrades with the orthogonality of signals. An OF of 0 means that the signals remain completely orthogonal. An OF of 1 means that orthogonality is completely lost and communication performance would be unchanged if random sequences were transmitted rather than orthogonal sequences. A consequence of OF is that intra-cell multiple access interference (MAI) in a system employing orthogonal transmitted sequences will be reduced relative to that of a reference system employing random sequences.

In CDMA communications, individual transmissions are maintained orthogonal with respect to other transmissions on the same frequency by coding each transmission with a direct sequence pseudo-random (PN) code produced by a chip code generator which is supplied to a spread spectrum modulator along with the intermediate frequency (IF) from an oscillator. CDMA allows multiple simultaneous signals which completely overlap in time and frequency. Despite this overlap, the number of spreading codes allows each signal to be detected separately, with limited interference from the other signals. The level of interference is further reduced if orthogonal codes are used, and the channel OF is low. The channel OF can be minimised through time alignment of the strongest path.

The use of orthogonal sequences offers benefits in cases where different users symbols are received with time alignment. For flat channels, time aligning signals at the receiver results in perfect orthogonality and hence no intra-cell interference. In the more realistic case, where channels exhibit dispersive multi-path characteristics (i.e. the channels are not flat), each separate multi-path component will interfere with each other component which has a different delay. In this case it is only possible, in general, to align a single component from each signal, and orthogonality will be partially lost due to the interference between non-aligned terms. The OF achieved in any scenarios depend both upon the channels involved and the relative timing between users signals.

Referring now to FIG. 1 there is shown a simple situation where only a single multi-path component from each user can be simultaneously aligned (and each component is separated in time by at least one chip duration). In this situation, alignment of the strongest component of each profile will result in the lowest value achievable with those channels. The spacing of the multi-paths is such that only a single component from each channel can be aligned simultaneously.

In the three cases shown in FIGS. 1a–c, the different time alignments for the same two channel power delay profiles vary from no orthogonality in case a i.e. OF=1.0 to a case where the OF=0.85, as shown in case b. In case c the strongest component of each channel is aligned thus removing the largest cross interference term and reducing the OF still further to OF=0.55. In this example, it is only possible to align a single multi-path component between each pair of users and the optimum timing alignment between the users is simple to determine; the strongest multi-path component of each user's signal should arrive simultaneously. In practice it is unlikely that more than a single multi-path component from each user's channel can be aligned simultaneously. In addition, when fractional-chip delays between components are present, performance is also dependent upon the set shape of the chip wave form.

Referring now to ITU-A and ITU-B, (International Telecommunications Union) channel models, which were developed for mobile systems, each path independently fades according to a Rayleigh distribution. For an IS95 system, for example, the chip period is 813.8 ns, and for a wide band system with three times the bandwidth it is 271.3 ns. The channel power delay profiles are provided in table 1 and it can be seen that at both chip rates, both channels have components which are not separately resolvable.

FIGS. 2 and 3 demonstrate the respective A and B channel models (for the purposes of particular example, the individual path powers are held equal to their mean values, but the phases are allowed to vary randomly). Each trace is for a different set of phases of the multi-path components. The peaks in the band limited power delay profile do not directly correspond in time with those of any of the multi-path components for the non-band limited channel. For the ITU-A channel, most of the channel power is contained in the first tap and the remaining significant taps have very short delays. It can be seen that even if the power of the individual multi-path is constant, relative phase changes between them can cause the resultant power to vary significantly, even when one of the components is much stronger than the other. For the ITU-B channel, the first two paths are of comparable strength and are closely spaced relative to the chip duration. If they have opposite phases then they will combine destructively resulting in very low output power for time delays in that region. The second and fourth traces have opposite phases for the first two paths whereby the timing at which maximum output occurs is approximately a quarter of the third and fourth components respectively. At the ITU-B wide band chip rate, the spacing between the first two components is approximately three quarters of a chip duration. The power delay profile which has a single peak at the IS 95 chip rate can split into two separate peaks at different timings as the phases are varied in the wide band case.

OBJECT OF THE INVENTION

The present invention seeks to provide timing alignment between orthogonal CDMA channels. The present invention also seeks to provide a technique which allows very rapid and precise control of signal time alignment, with a minimum of signalling overhead. The invention further seeks to provide a CDMA communications arrangement for fixed wireless access systems.

STATEMENT OF THE INVENTION

In accordance with a first aspect of the present invention, there is provided a method of determining timing offsets in a CDMA communications link between a base station and a subscriber station, the method comprising the steps of: transmitting a signal by the subscriber using a default timing offset; receiving such signal by the base station and detecting the various multipath components using a Rake receiver, and; when the base station determines that a subscriber station needs to change its timing alignment, it transmits to the subscriber a message identifying a particular timing offset selected from a set of predetermined offsets which the subscriber should use.

The set of predetermined offsets can be stored in a look-up table. The look-up table can be in the form of a volatile storage medium. The look-up table can be in the form of a non-volatile storage medium. The default timing offsets can be those that have been used on a most recent transmission; those that have been used most frequently by the system or predetermined offsets.

Adjustment of the timing can be carried out by the insertion of a short signal into each frame to determine which offset should be selected. Time alignment commands transmitted by the base station may be transmitted once for each transmission or can be transmitted by the base station when signal quality has been degraded. Fine tuning can be performed with small adjustments of time offset, once a particular offset has been selected. The CDMA communications link may be a fixed wireless scheme, wherein the subscriber station is not mobile.

In accordance with a second aspect of the present invention, there is provided a method of operating a CDMA communications link between a base station and a subscriber, the method comprising the steps of: receiving at the subscriber station signals from a base station, referring to time offset data; transmitting signals to the base station using a time offset determined by the time offset data, and; when the base station determines that the time offsets should be adjusted, a pre-determined time offset is selected from the time offset data and such selected pre-determined offset is utilised.

The time offset data can be pre-configured. The time offset data may be determined by experience over a number of iterations and can be updated as appropriate. Preferably, upon initial transmission of a message, the last offset employed by the subscriber station is employed. The CDMA link may be a fixed wireless link.

The speed in creating a communications link can be improved by the time alignment of signals to a predetermined time offset rather than continuously varying the time offset. The timing may be determined as being sub-optimum, but savings in overheads and the convenience in the use with orthogonal sequences can generally be sufficient to negate any such drawbacks. Further, this approach has the benefit of being easily implementable and the degradation from optimum is unlikely to be great.

In accordance with a third aspect of the present invention, there is provided a subscriber station for use in a CDMA communications system between a basestation and a plurality of subscribers, the subscriber station having a look-up table providing a list of time offsets, from which a selected time offset is employed in communication with a base station.

Preferably there is provided means responsive to signals from the base station to change the timing offset to a different timing offset. The time offset can be determined by experience over a number of iterations and can updated as appropriate. The CDMA link may be a fixed wireless link.

In accordance with a fourth aspect of the present invention, there is provided base station for use in a CDMA communications system between a basestation and a plurality of subscribers, the base station having a look-up table providing a list of time offsets, for each active subscriber unit, this table being communicated to a subscriber station upon call initiation or when it is determined the table needs to be updated.

The time offset can be determined by experience over a number of iterations and is updated as appropriate. Alternatively predetermined offsets are employed. The CDMA link may be a fixed wireless link.

In accordance with a still further aspect of the invention there is provided a CDMA communications system operable with predetermined timing offsets.

BRIEF DESCRIPTION OF THE DRAWINGS

In order that the present invention can be more fully understood and to show how the same may be carried into effect, reference shall now be made, by way of example only, to the figures as shown in the accompanying drawing sheets wherein.

Table 1 shows power delay profiles for ITU-A and ITU-B channel models; and Table 2 shows Orthogonality Variations for Simulated Multipath versus Alignment Technique.

DETAILED DESCRIPTION OF THE PREFERRED EMBODIMENTS

There will now be described, by way of example, the best mode contemplated by the inventors for carrying out the invention. In the following description, numerous specific details are set out in order to provide a complete understanding of the present invention. It will be apparent, however, to those skilled in the art, that the present invention may be put into practice with specific variations.

Figure 1:
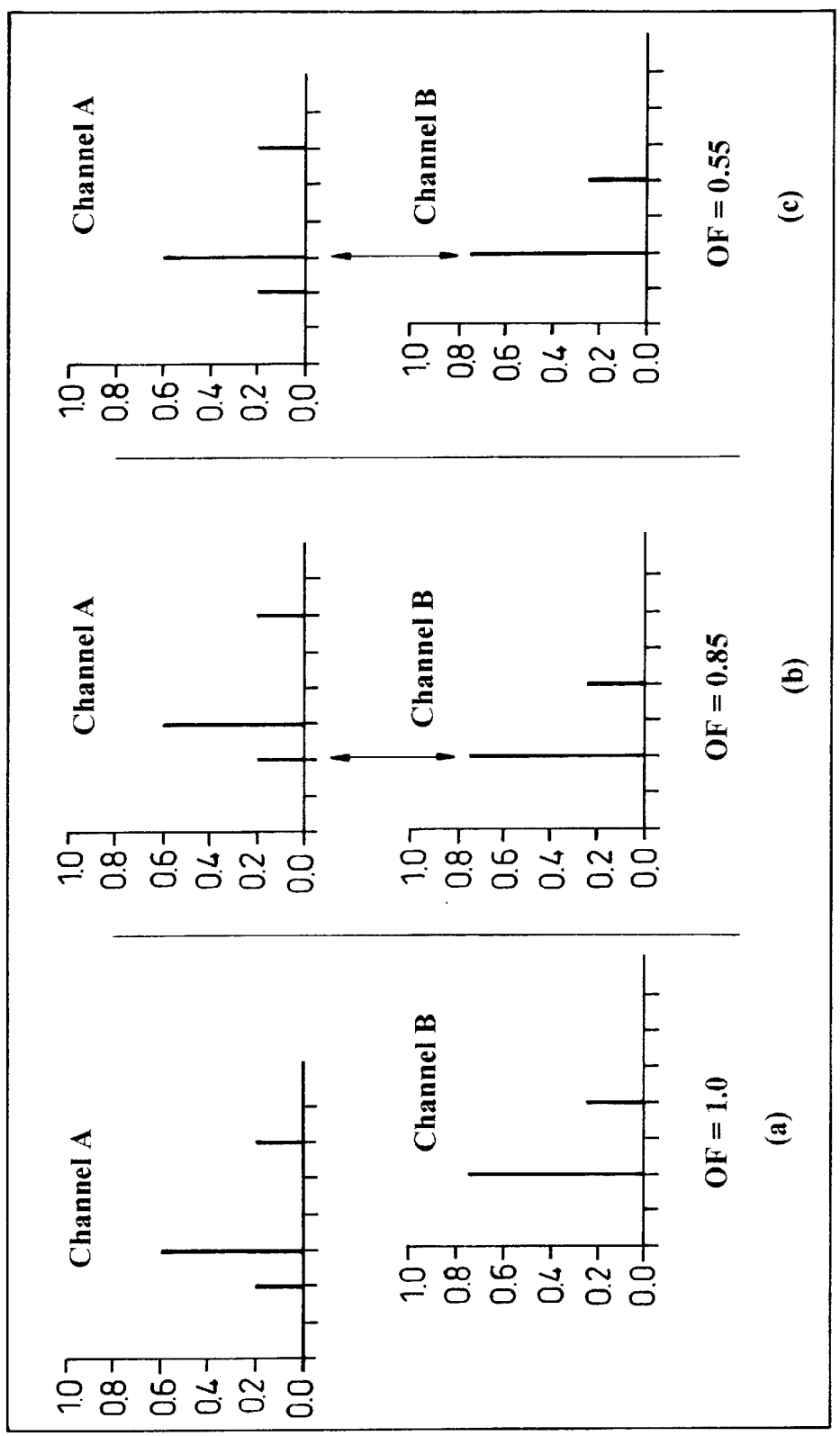
FIGS. 1a–1c show CDMA timing alignment profiles for two channels which each have a single multi-path component.
Figure 2:
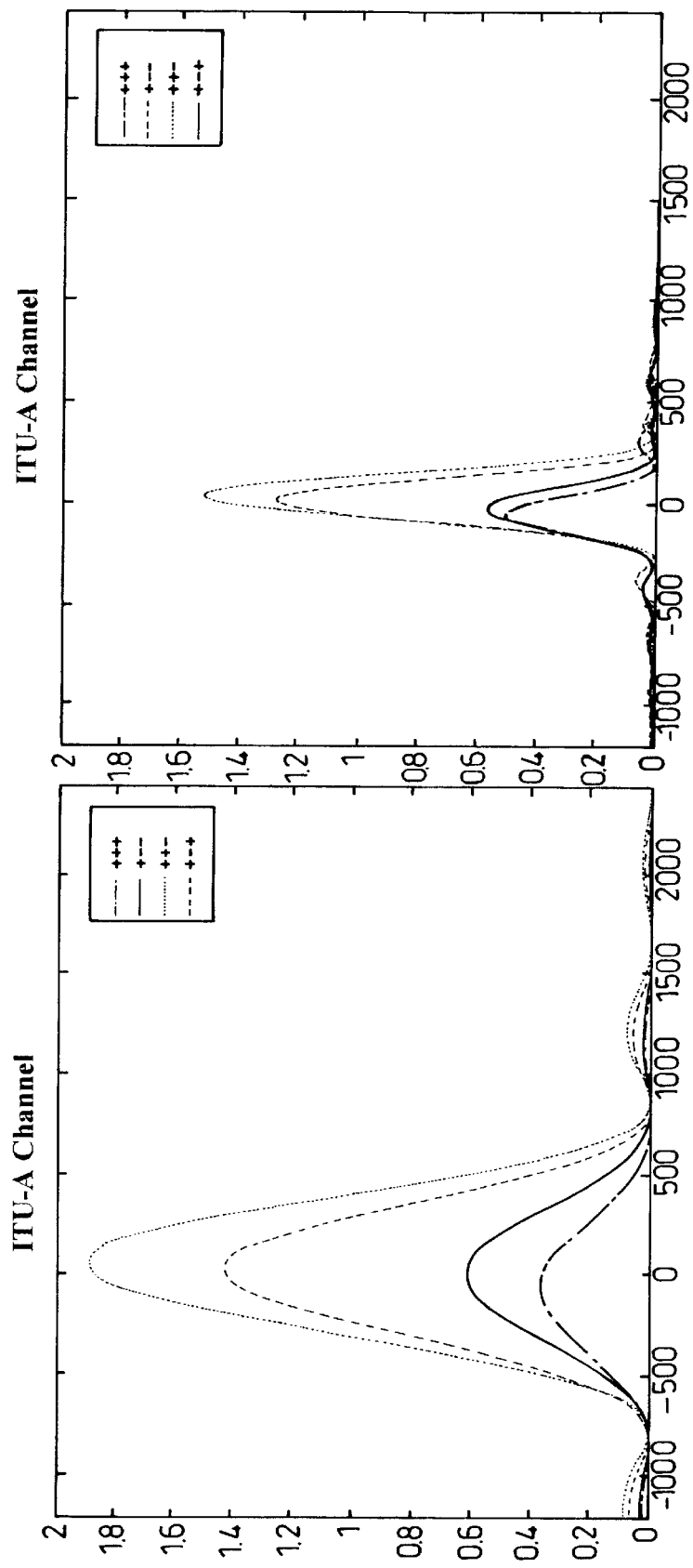
FIGS. 2 and 3 show ITU-A and ITU-B channel models.
Figure 3:
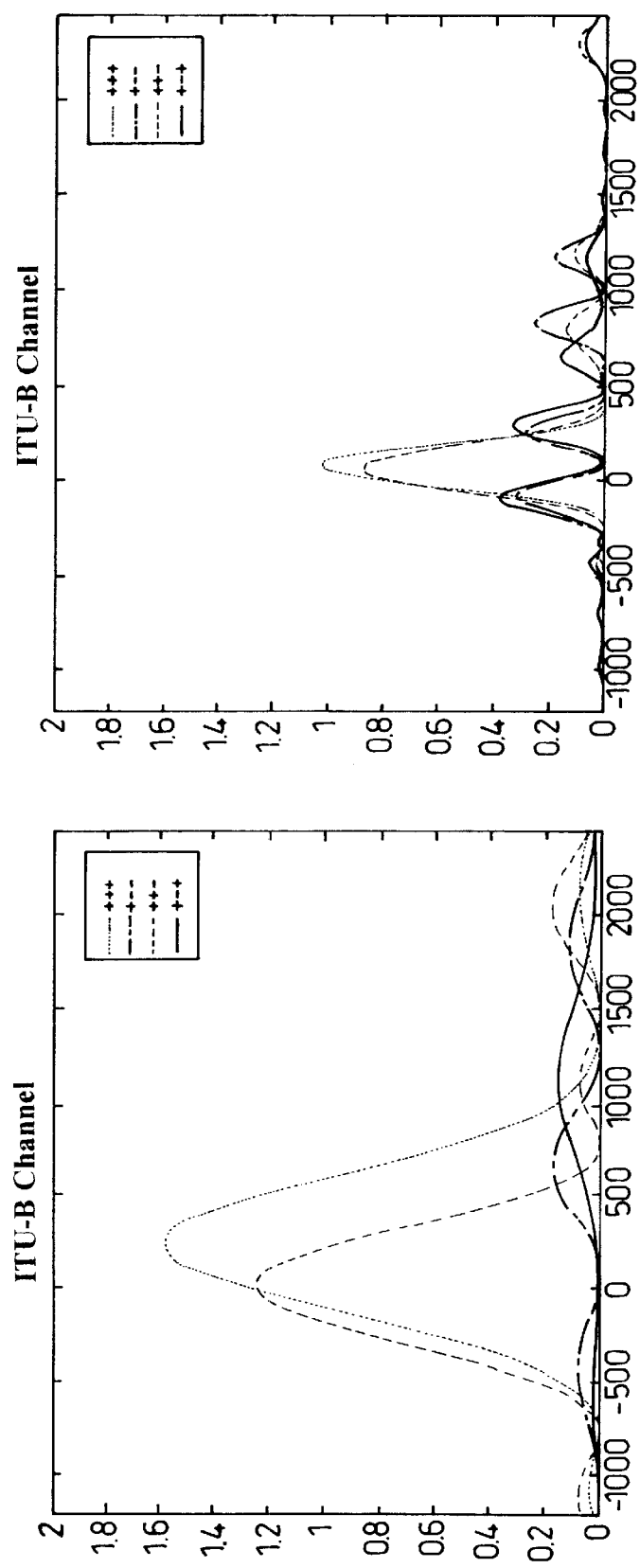
Figure 4:
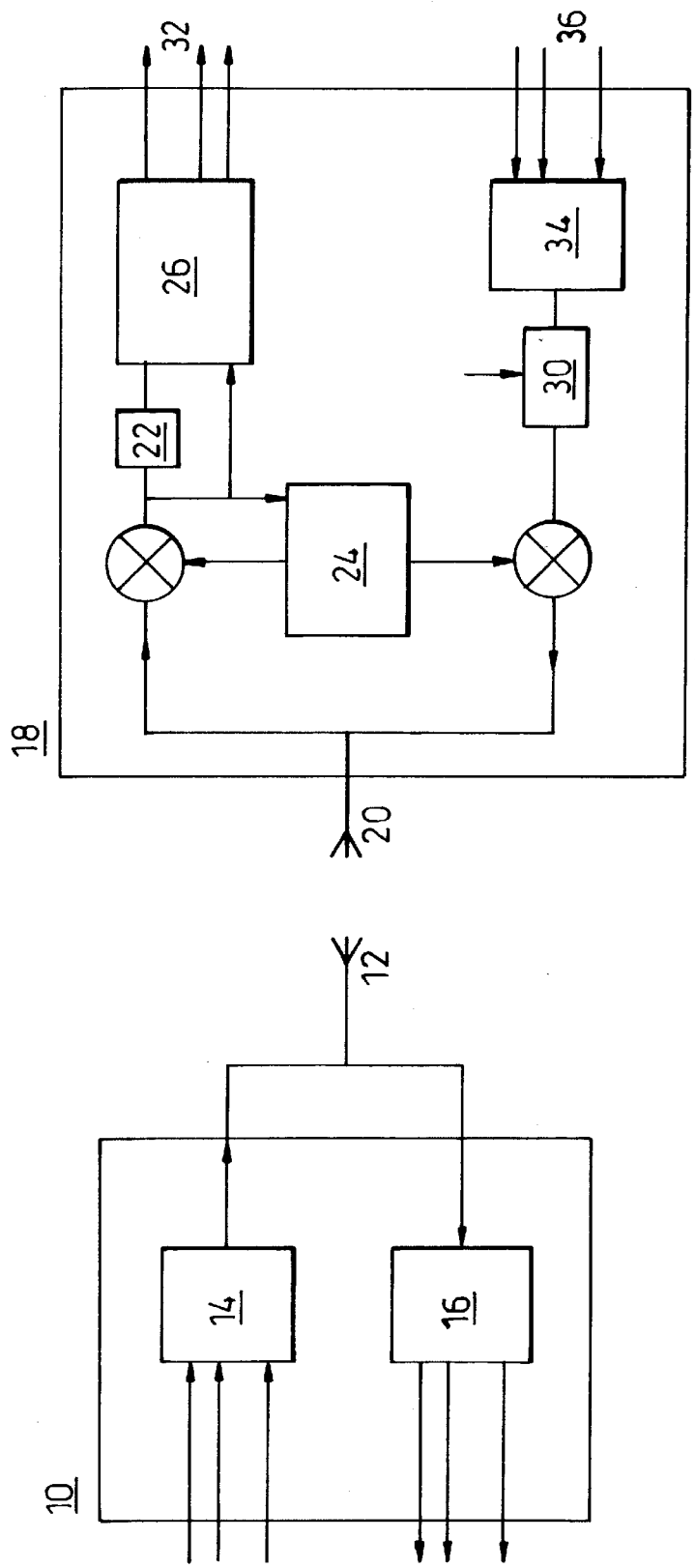
FIG. 4 details the structure of a prior art base station and a subscriber station in block format.

Referring now to FIG. 4, there is shown a base station 10 which includes a modulation spreading apparatus 14 that modulates traffic channels to be transmitted via antenna 12. Modulation could be for example by quadrature phase shift keying (QPSK) or other phase shift keying modulation techniques, which signals are then spread with a spreading code appropriate to each traffic channel. The spreading code operates according to the summation of first and second codings. The first coding is a randomising coding particular to the particular base station 10 whereby signals from different base stations are uncorrelated whilst the second coding comprises an orthogonal coding operation whereby all traffic channels from a particular base station are orthogonal to each other. As is commonplace, the subscriber station 18 contains a delay lock loop 22 which synchronises the signals to a pilot signal which provides spreading rate and code phase synchronisation for the despreader and demodulation block 26 to recover the transmitted traffic 32 via a processing block such as error correction devices, as is known to persons skilled in the art.

The subscriber station 18 also contains a modulation spreading device 34 that takes the traffic channels to be transmitted 36 and modulates them—which may not necessarily be the same modulation as the forward link. Each traffic channel is spread according to the appropriate spreading code. The spreading code is formed in the same fashion as the forward link. These modulation spreading operations are performed synchronously to the data signals on the received forward link signal which are then passed to a variable time delay device 30, converted to radio frequencies and transmitted by antenna 20 For the reverse link, each subscriber unit can be remotely instructed by the base station with an appropriate delay in the signal path whereby the modulation symbols of each subscriber unit are received by the base station in time alignment. The base station 10 contains a despreader and demodulator 24 which separates the channels from the various base stations in the conventional way. Cross-channel interference is reduced since the transmissions from the respective subscriber stations have been time delayed whereby the spreading codes are received synchronously with respect to the orthogonal spreading codes.

The radio transceivers (not shown) associated with the base station and the subscriber unit have a local oscillator reference frequency generator. The centre frequencies may drift in time; the subscriber unit is provided with a device 24 for determining any variation in such centre frequency and compensates for such variation, as is known.

In orthogonal CDMA communication systems it is desired that the main signal of each channel arrives at a base station from outstations within a fraction of a chip of one another whereby the orthogonality among all channels is maintained. Upon demodulation, all channels except the channel of interest provide a cross-correlation of substantially 0 with respect to the unwanted channels. Performance is much improved where delay spread is low.

For the purposes of detecting an isolated transmission, the timing of the peak(s) in the power-delay profile of the received despread signal output has no effect on performance. It is essential that the receiver is matched to the received waveform. When considering multiple simultaneous transmissions, the relative timings of the received signals are adjusted in order to minimise the cross-interference effects.

Determining the optimum timing alignment for a specific case can be a very difficult since the interference between each pair of received signals is a highly non-linear function of relative timing. If there are N users then N−1 offset timings must be simultaneously optimised in order to find the optimum solution. Because the performance is heavily non-linearly dependent on these timings then an exhaustive search is the only realistic way to determine the optimum solution. The smaller the allowable time steps, the larger the search space becomes. Furthermore, the solution obtained will only be true for as long as the channels remain unchanged; which in practice means that the search would need to be frequently repeated.

In practice this optimum time alignment algorithm is too complex and a much simpler sub-optimum approach is taken whereby the operation comprises the aligning of the timings at which each users' signal causes the largest output from a single RAKE finger, i.e. the timing for which the output power of a filter matched to the transmitted waveform is at its peak. If each multipath component is separately resolvable then this is equivalent to aligning the timings of the strongest individual component, regardless of the path phases.

In order to achieve a desired time alignment of the signals, the system must determine what first alignment is actually required, and the system must have the ability to adjust the timings of the Subscriber Units (SU's) such that they arrive with the desired timing at the Base-Station (BS). Note that in all cases it is reasonable to assume that the BS is aware of the timings and strengths of the multipath components on the channels from each of the users, because the RAKE receiver has to track them even in a conventional system.

One technique that has been used is that of 'Slewing'. Slewing is an approach directly analogous to that of closed loop power control such as is used in conventional IS-95, except that it adjusts timing rather than power. Using this approach, the base station continually sends timing correction commands to each subscriber unit, each consisting of a single bit instructing the subscriber unit to slightly advance or retard its timing, so as to provide the desired alignment of signals at the BS. A continuous stream of commands needs to be sent, even if the timing is correct, which may comprise a considerable overhead. The actual timing will continually jitter around the correct timing due to the fact that each command forces a change. The time taken to change alignment is proportional to the change in timing offset required. Fast re-alignment requires either large step size; which will result in considerable timing jitter, or a larger number of timing alignment commands which results in a larger signalling overhead on the downlink.

A first embodiment in accordance with the invention employs the stability of the timing offsets. Because the individual multipath components are stable in time, any one subscriber unit's channel will only be required to operate within a small region around each of a small number of possible time offsets; there is no need for the timing alignment to be able to continually track over a continuous wide-range, unlike the power control mechanism. Because of this an alternative to slewing is to use time alignment commands which instruct the subscriber unit to 'jump' its timing directly to the required offset. Jumping utilises knowledge of channel characteristics whereby time delays of the individual multipath components for any given channel are often quite stable. This does not mean that the required time alignment itself will be fixed because the effects of fading mean that any multipath component may instantaneously become the strongest component and thus the preferred timing offset should jump from one offset to another. Jumping is particularly suitable for fixed wireless applications. An additional stewing control could also be included to fine tune the timing, and this would be able to use smaller time steps, and be sent less often because there would be no requirement for it to be able to rapidly change timing by a significant amount as such changes are carried out by the jumping process.

The implementation method comprises the following steps: upon initial transmission, for each subscriber unit, the subscriber unit transmits using the time alignment that has been used most often or most recently in the system so far. The BS then detects the various multipath components using its Rake receiver, and transmits a message to the subscriber unit providing a list of timing offsets together with an identifying number for each one, corresponding to each of the multipath delayed signal components received.

From this point onwards, whenever the BS decides that a subscriber unit needs to change its timing alignment, it transmits the identifying number of the timing to which the subscriber unit should jump. If the set of timings change significantly then the BS can then transmit a message containing the new timing information. Although each time alignment command will require more data than in slewing since several bits are employed rather than one, they only need to be sent once for each significant change in alignment rather than continually. Slewing would only require one-bit commands, which instruct the subscriber unit to either advance or retard timing. Jumping would require several bits, to transmit the identifying number of the desired multipath timing and since such messages are transmitted less frequently in jumping than in slewing, the overall control message overheads are less. In addition, jumping may require additional error detection because the effects of an error in decoding a jump command will be more significant than a slew command. Error correction would be excessive because the BS can simply re-send the command if the subscriber unit fails to adjust timing. The benefits of the jumping approach over that of slewing are that the downlink overhead will be smaller, desired timing changes will happen very rapidly, and timing jitter will not occur.

The technique provides advantage over slewing when considering similar power paths at different delays. As they fade in power, the desired timing will continually and suddenly switch between them. Whilst slewing cannot cope at all well with this situation, jumping can cope with such situations.

Form of Time Alignment Signals:

LUT Update Message. This consists of a custom message which specifies the new timing offsets to be used from that point onwards. This message will be sent whenever the timing comparator determines the that the look-up table entries for the timing of multipath components are no longer current.

Alignment selector signal. This consists of a short message (a few bits) embedded into the frame structure. The message may be split across multiple frames, if slower update is acceptable, as follows:

| signal content | $AS_1$ | FRAME 1 |
| signal content | $AS_2$ | FRAME 2 |

Where either $AS_n$ is a complete selection signal, or the concatenation of $AS_n$ to $AS_{n+m}$ a complete selection signal. This message instructs the subscriber to use a particular timing entry in its look-up table as its time alignment offset.

Fine adjustment signal (optional). This consists of a very short (typically single bit) signal inserted into each frame. This is to fine tune either the time alignment of the currently selected reference timing, or the time alignment of all timing references in the LUT.

Figure 5:
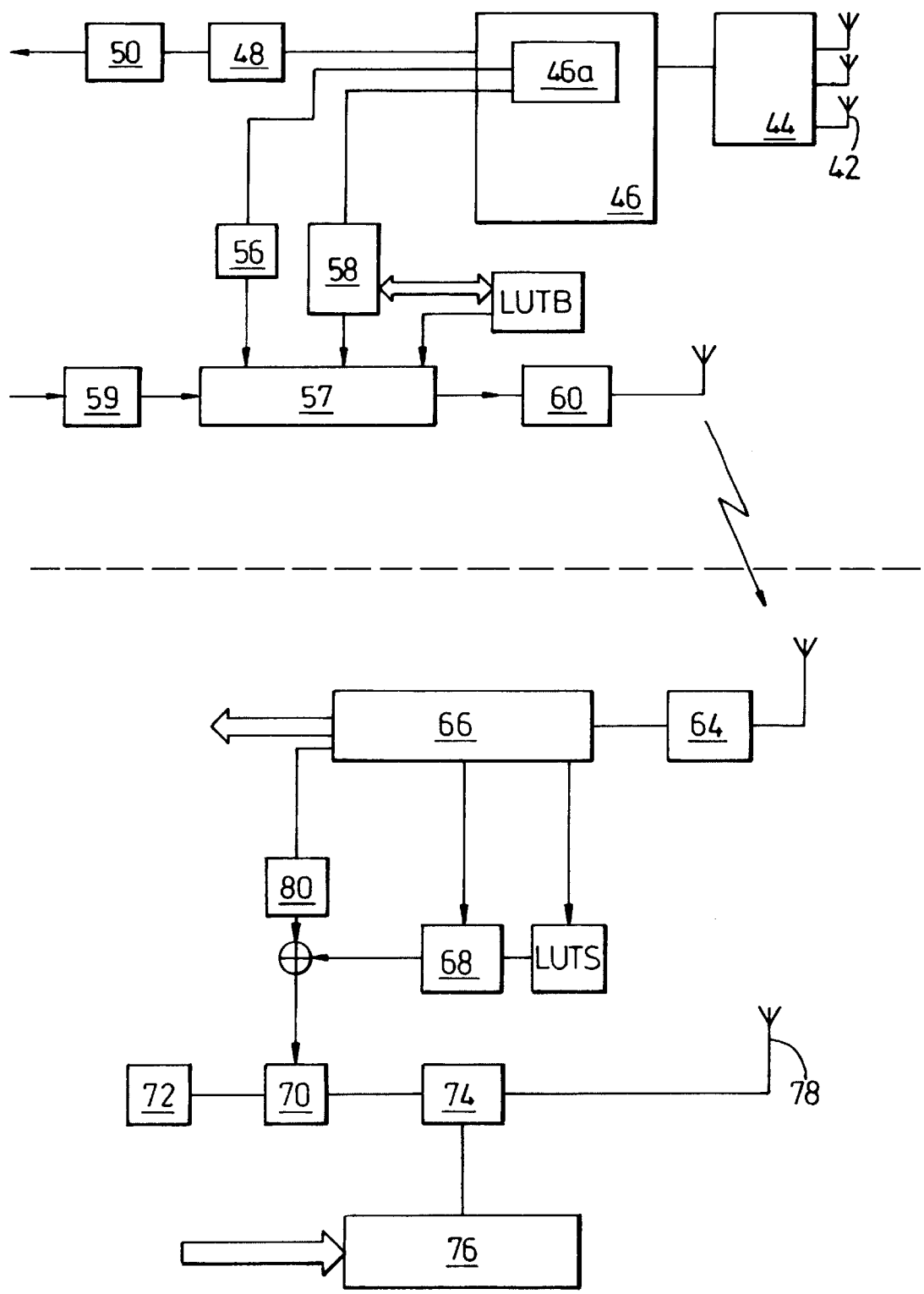
FIG. 5 details the structure of a base station and a subscriber station in accordance with the invention in block format.

The present invention will now be described with reference to FIG. 5. The base station 40 comprises an antenna bank 42 and switch matrix 44 which output receives signals through a demodulator bank 46, typically comprised of rake finger demodulators 46a. Each demodulator outputs the data signal, an indication of the instantaneous power and a timing signal. The data signal is combined with other received signals in combiner 48 which outputs signals to a decoder 50 prior to further processing. The power and timing signals are fed, respectively, to a selector and comparator 56, 58. The selector identifies, in regular transmissions, the identification number of the strongest signal and provides this information to a signal combiner 57. The comparator refers to a look up table LUT-B to determine appropriate time offsets. The comparator will also indicate to the LUT-B that an update is necessary if the current demodulator times differ significantly from those stored in the LUT-B. The comparator may also provide a fine offset correction signal to the signal combiner 56. The signal combiner 56 receives signals from an encoder 59 which encodes reverse traffic data. Signals are then output from the Signal combiner via modulator 60 prior to transmission from the base station.

At the subscribers terminal, the receive antenna 62 receives signals which are demodulated via demodulator 64 and then passed through a timing signal extractor 66, which extractor sends updated look-up table information to a subscriber look-up table, LUT-S. Additionally, the extractor extracts the identifying number of the LUT-S entry, and instructs a selector 68 to select the corresponding time offset value from the LUT-S and the subscriber uses these values to adjust the timing of the transmit code operators in conjunction with a code generator 70 and clock 72. The code generator outputs o a modulator 74 which receives signals from an encoder 76 prior to transmission via transmit antenna 78. Fine adjustment of the time offset may be performed by unit 80.

It is considered that if the channel multipath timings can be relied upon to be stable then the jumping approach is the better technique. If the timings of the multipaths change continually then slewing will be better, but this is not expected to be the case in many channels, e.g. FWA. The timing variation due to the interaction of sub-chip spaced multipaths will be relatively slow unlike that of widely time separated multipaths fading relative to each other, which can cause the required timing to suddenly jump by multiple chips and is also limited in its range around the timings of the individual multipath components. The constraints with this case where the multipath components are widely separated in time fading relative to each other, which can cause the required timing to suddenly jump by multiple chips.

Simulations were performed using independent channels based upon the ITU-A and ITU-B models where for independent Rayleigh fading multipath components were and also for the case where the first path is fixed. In each simulation, all user channels were taken from the same basic channel model, but with independent normally distributed timing adjustment for the position of each multipath component. The four alignment techniques used are:

'First component', in which the channels are aligned such that the first multipath component for all channels arrive simultaneously;

'Instantaneous peak', in which the timings are such that the peak instantaneous output from a single decorrelator (Rake finger) for each user occurs simultaneously;

'Jump', in which the peak timing is selected from a small number of allowed timings, and;

'Peak mean', in which the timing which provides the peak mean output (averaged across all phases of each multipath component) for each user is aligned. The results are shown in Table 2.

From Table 2, it can be seen that the 'jump' time alignment algorithm, the approach is equivalent to the 'instantaneous peak' approach, except that the only time offsets allowed for each user are the arrival times of the individual multipath components for that user's channel. Note that 'jump' results have not been provided in all cases. Further, it is noted that the performance of 'First component' and 'Peak mean' alignment approaches provide similar performance. The performance of the 'Instantaneous peak' is better, which is expected, as this approach adjusts the timing depending upon the instantaneous channel profiles, rather than staying at one fixed 'compromise' value. The performance difference between the three approaches is generally smaller for the higher chip-rate system.

Results are provided for both channel models at both the IS-95 chip rate, and the proposed wideband rate, each of these options being performed for the case where all multipath components were independently Rayleigh fading, then repeated for the case where they are all Rayleigh fading except for the first component of each channel, which is held fixed (assumed LOS). This latter set of simulations was performed in order to get some idea of how performance may change when fixed LOS paths were present, which is likely in a fixed wireless access environment.

The OF values for the ITU-A channel were found to be much lower than those for the ITU-B channel. This can be explained since the ITU-A channel is approximately a single path channel, whilst the ITU-B channel is closer to being a two path channel. Further the OF is higher for higher chip rates. Since higher chip rates are better able to separately resolve multipath components, and as a result more cross terms between components are present (although the extra diversity may allow a lower transmit power, which has the secondary effect of reducing inter-cell interference).

Note that the 'Instantaneous peak' algorithm requires continuous but small adjustments to the transmitter timing around one of a small number of nominal offsets. The time 'jump' alignment approach together with slow time adjustment seems best suited for implementation of this. Note however from the results above that 'jumping' alone may be sufficient as the additional degradation is small.

For the ITU-A based channels the desired timing only varies over a range of approximately half a chip duration. For the ITU-B based channels the total variation is of the order of four or eight chips, but the desired times are clustered into a narrow range around a few paths. In fact, the desired timing is never at the majority of possible timings in this range. These results support the 'jumping' approach to time alignment control.

If all multipath components can be separately resolved and every pair of multipath components across all user's channels is spaced by a unique number of chips then calculation of the optimum timing alignment for all users is trivial, corresponding to time aligning the strongest multipath of all users. In practice, neither of these conditions are likely to hold. In this case calculation of the optimum time alignments between users, even across time-invariant channels, is a very complex non-linear optimisation problem. Including the effects of time variations in the channels makes this a problem with a time-variant solution.

Simulations to calculate OFs using these alignment algorithms for channels based upon the ITU-A and ITU-B channel outdoor to indoor channel models, at both the IS-95 chip rate and the proposed wideband rate for the cases where all multipath components are assumed to be independently Rayleigh fading, and where the first multipath component was assumed to be fixed (LOS).

The invention defines a system which can operate as either a mobile or a fixed system (or even a mixture of the two) with minimal changes. For example, if an IS-95 like mobile system is to be used as the baseline system, then timing alignment capability can be provided in order for orthogonality to be provided on the uplink.

In fixed wireless access systems, there is a slow variation in the channels and attempts to time align uplink signals in order to maintain orthogonality would be easy to implement. In the mobile environment this is less likely due to the more rapid variations in the channels involved, but is something that is desirable. Mobile systems typically have a high speed closed loop power control, which is excessive for the fixed scenario. This suggests that an efficient way of implementing the time alignment control sub-channel would be to use some of the power control sub-channel capacity for time alignment commands. In this way the meaning of the 'power-control' bits would be changed between fixed and mobile, but no fundamental change to the air-interface is required. If slewing is used then every other power control bit could be replaced with a time alignment bit, for example. If jumping is used then a similar arrangement could be used in which each power control command is sent a single bit at a time. The data bandwidth of the 'power control' channel could also be reduced in the fixed case, especially if jumping is used. Assuming an IS-95 type downlink, power control bits can simply replace coder output bits, thus injecting code bit errors into the transmitted signal. Reducing the data throughput on the 'power-control' sub-channel would improve error rates at the receiver. In a fixed environment using jumping, it may be possible to reduce the required data rate on the sub-channel considerably. If jumping is used, then some additional signalling messages will be required, specifically to allow the BS to inform the SU of the list of timing offsets and their identifying numbers. The commands instructing the SU to jump timing to a different component could also be sent as system messages, but this is likely to incur an excessive overhead. These extra messages will not affect the mobile implementation as they will simply not occur.

I claim:

1. A method of using timing offsets in CDMA communications system reverse or uplinks between a number of subscriber stations and a base station, the method comprising:

transmitting signals by the subscriber stations using default transmission timing offsets;

receiving said signals by the base station; detecting various multipath components of said signals by said base station; and when the base station determines that a subscriber station needs to change its transmission timing offsets, transmitting to said station a message identifying a new timing offset, based on the detected multipath components.

2. A method according to claim 1, wherein the default timing offsets are those that have been used on a most recent transmission.

3. A method according to claim 1, wherein the default timing offsets are those that have been used most frequently by the CDMA communications system.

4. A method according to claim 1, wherein adjustment of the timing is carried out by a message comprising a short signal to determine which offsets should be selected from a list of predetermined offsets.

5. A method according to claim 1, wherein time alignment commands are transmitted by the base station when signal quality has been degraded.

6. A method according to claim 1, wherein the CDMA communications system is a fixed wireless access system.

7. A method as claimed in claim 1 wherein said message identifies a predetermined timing offsets.

8. A method as claimed in claim 7 wherein said message additionally comprises a command regularly transmitted by the base station advancing or retarding said timing offset by a predetermined amount.

9. A method as claimed in claim 1 wherein said message is a command regularly transmitted by the base station advancing or retarding said timing offset by a redetermined amount.

10. A method as claimed in claim 1 wherein in CDMA system used direct sequence coding.

11. A method as claimed in claim 1 wherein the base station uses a Rake receiver to detect multipath components in the received subscriber station signals.

12. A CDMA communications system comprising a number of subscriber stations and a base station, wherein; the subscriber stations are arranged to transmit signals using default transmission timing offsets;

the base station is arranged to receive said signals including detecting various multipath components of said signals; and the base station is arranged to determine whether a subscriber station needs to change its transmission timing offset, and to transmit to said subscriber station a message identifying a new timing offset, based on the detected multipath components.

13. A subscriber station for use in a CDMA communication system, the subscriber station arranged to transmit signals to a base station using a default transmission timing offset;

wherein said subscriber station is further arranged to receive a message from said base station to use a new timing offset, based on detected multipath components, and to a transmit said signal using said new timing offset, wherein said message is a command regularly transmitted by the base station advancing or retarding said timing offset by a predetermined amount.

14. A subscriber station as claimed in claim 13 further comprising a list of predetermined timing offsets, said received message identifying one of said offsets.

15. A base station for use in a CDMA communication system and arranged to receive signals from a number of subscriber stations using default transmission timing offsets; to detect various multipath components of said signals; to determine whether a subscriber station needs to change its transmission timing offset, and to transmit to said subscriber station a message identifying a new timing offset, based on the detected multipath components.

16. A base station as claimed in claim 15 wherein said message identifies a predetermined timing offset.

17. A base station as claimed in claim 15 wherein said message is a command regularly transmitted by the base station advancing or retarding set timing offset by a predetermined amount.

18. A base station as claimed in claim 15 further comprising a Rake receiver to detect multipath components in the received subscriber station signal.

19. A base station as claimed in claim 18 wherein the new timing offset is arranged such that one of the multipath components of one subscriber station is time aligned with one of the multipath components of another subscriber station.

* * * * *